US011857128B2

(12) United States Patent
Shen

(10) Patent No.: US 11,857,128 B2

(45) Date of Patent: Jan. 2, 2024

(54) AUTOMATIC SHOWER HEAD

(71) Applicant: Wei-Wei Shen, Zhejiang (CN)

(72) Inventor: Wei-Wei Shen, Zhejiang (CN)

( * ) Notice: Subject to any disclaimer, the term of this patent is extended or adjusted under 35 U.S.C. 154(b) by 252 days.

(21) Appl. No.: 17/477,616

(22) Filed: Sep. 17, 2021

(65) Prior Publication Data

US 2023/0089290 A1 Mar. 23, 2023

(51) Int. Cl.

*A47K 7/04* (2006.01)
*A47K 3/28* (2006.01)
*B05B 1/18* (2006.01)

(52) U.S. Cl.

CPC ................ *A47K 7/04* (2013.01); *A47K 3/281* (2013.01); *B05B 1/18* (2013.01)

(58) Field of Classification Search

CPC ............. A47K 7/04; A47K 3/281; B05B 1/18
USPC .............................................................. 4/606
See application file for complete search history.

(56) References Cited

U.S. PATENT DOCUMENTS

2010/0083438 A1* 4/2010 Kao ........................ A46B 13/02 4/606
2011/0142529 A1* 6/2011 Oh ........................ E03C 1/0409 401/268
2014/0196229 A1* 7/2014 Shen ...................... A46B 13/04 15/29

* cited by examiner

*Primary Examiner* — Christine J Skubinna

(57) ABSTRACT

An automatic shower head contains: a body and a shower scrubber. The body includes a casing, a receiving cap fitted with the casing, a handle, a first connection element, a first water guide ring, and multiple spray bars and a second water guide ring. At least one first seal ring is retained on a water conduit of the first connection element and the second water guide ring. The casing has a coupling loop. The shower scrubber includes a panel, a lid, an accommodation sleeve, a second seal ring, and a rotation element, and a fixing plug. The lid has a copper pin, a waterproof sheet, a first circuit board, a gear seat, a gear assembly, a gear shaft, a drive gear, a holder, a motor, a battery, a contact sheet, and a second circuit board.

3 Claims, 5 Drawing Sheets

AUTOMATIC SHOWER HEAD

FIELD OF THE INVENTION

The present invention relates to a shower head, and more particularly to an automatic shower head.

BACKGROUND OF THE INVENTION

Conventionally, the shower head can be used alone, which cannot realize automatic scrubbing, face washing, massage bathing and exfoliation. At the same time, it is inconvenient to replace the brush head. It is not convenient to use while scrubbing and washing at the same time. But can only be combined but cannot be separated, which is not conducive to cleaning and maintenance. Based on the above shortcomings, an automatic shower is proposed.

The present invention has arisen to mitigate and/or obviate the afore-described disadvantages.

SUMMARY OF THE INVENTION

One aspect of the present invention is to provide an automatic shower head which is capable of scrubbing, massaging, exfoliating and washing a face of a user.

Another aspect of the present invention is to provide an automatic shower head which contains a head element replaceable onto the automatic shower head.

To obtain the above aspects, an automatic shower head provided by the present invention contains: a body and a shower scrubber.

The body includes a casing, a receiving cap fitted with the casing, a handle, a first connection element accommodated in the receiving cap, a first water guide ring defined between the receiving cap and the first connection element, and multiple spray bars and a second water guide ring which are arranged on an inner wall of the casing, the first connection element is connected with the second water guide ring in a ultrasonic welding manner so as to form a water conduit, the multiple spray bars are accommodated in the water conduit, and at least one first seal ring is retained on an inlet of the water conduit of the first connection element and the second water guide ring, the multiple spray bars are in communication with the first water guide ring, and the handle is connected with an extension of the casing, the casing also has a coupling loop received therein.

The shower scrubber includes a panel, a lid, an accommodation sleeve, a second seal ring fixed on a center of a first surface of the lid, and a rotation element connected with the second seal ring and fitted in a positioning orifice of the lid, and a fixing plug fitted in the rotation element, the second seal ring is fitted in the rotation element and the lid, and the panel is retained on the first side of the lid, the lid is connected with the accommodation sleeve in a ultrasonic welding manner, the lid has a copper pin, a waterproof sheet, and a first circuit board which are received on a peripheral side of the first surface of the lid, the lid has a gear seat, a gear assembly, a gear shaft, a drive gear, a holder, a motor, a battery, a contact sheet, and a second circuit board which are arranged on a second side of the lid in order.

Preferably, the holder is fixed on an output end of the motor, the drive gear is inserted through the holder to connect with the output end of the motor, and the gear shaft is fixed on a first side of the holder, the gear assembly is connected on an end of the gear shaft, the holder is fitted on a second side of the gear seat, and the gear seat is mounted on the second side of the lid.

Preferably, the shower scrubber is engaged in a center of the body.

In operation of the shower scrubber, the battery is charged electrically so that the switch is pressed to drive the motor to actuate the drive gear to rotate, such that the head element of the automatic shower head is driven by the driven gear to revolve. Preferably, the switch has different levels so as to adjust a rotation speed of the motor by using the second circuit board, and the shower scrubber is engaged in the center of the body so as to scrubber and wash the user easily.

DETAILED DESCRIPTION OF THE PREFERRED EMBODIMENTS

Figure 1:
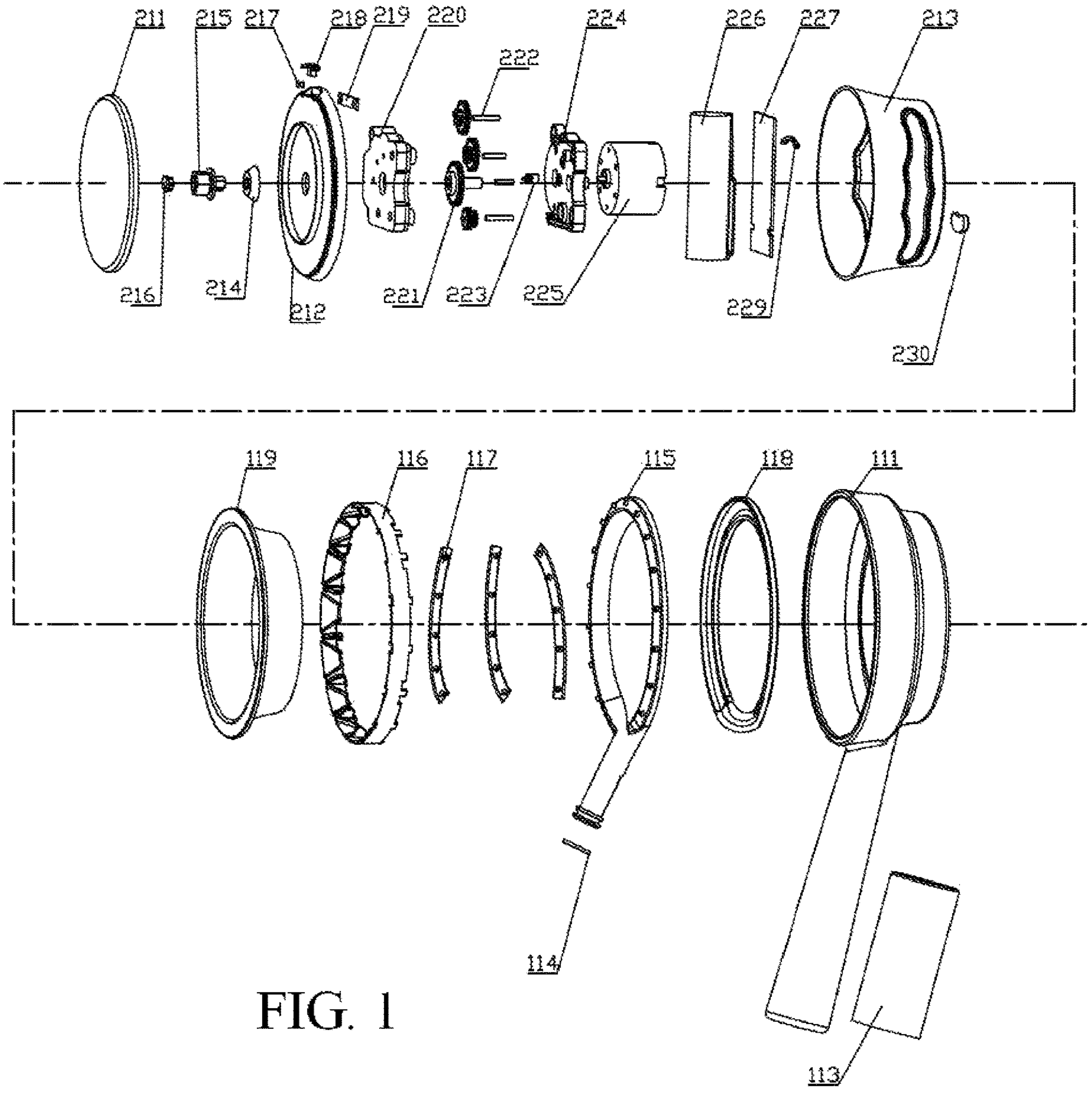
FIG. 1 is a perspective view showing the exploded components of an automatic shower head according to a preferred embodiment of the present invention.
Figure 2:
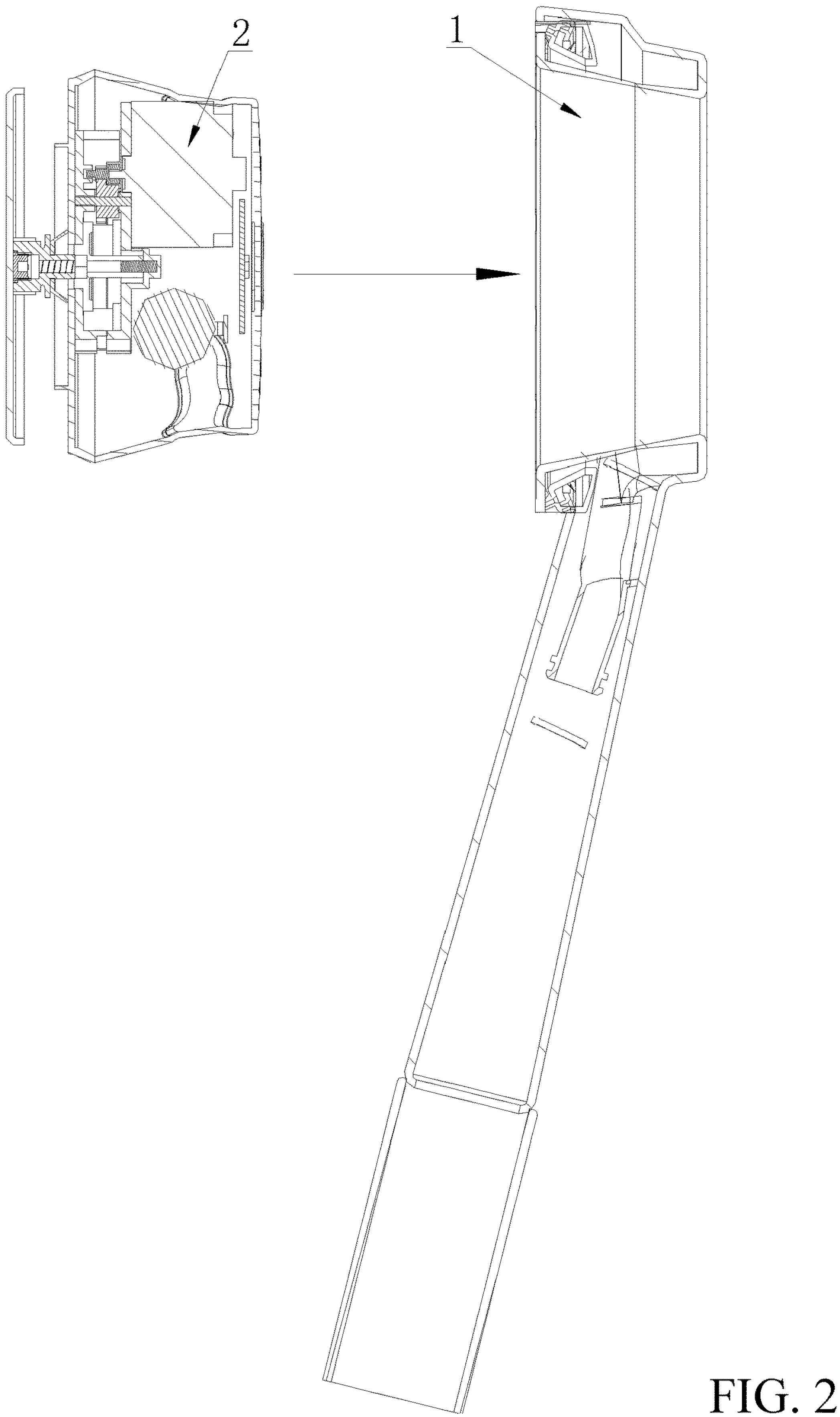
FIG. 2 is a cross sectional view showing the assembly of the automatic shower head according to the preferred embodiment of the present invention.
Figure 3:
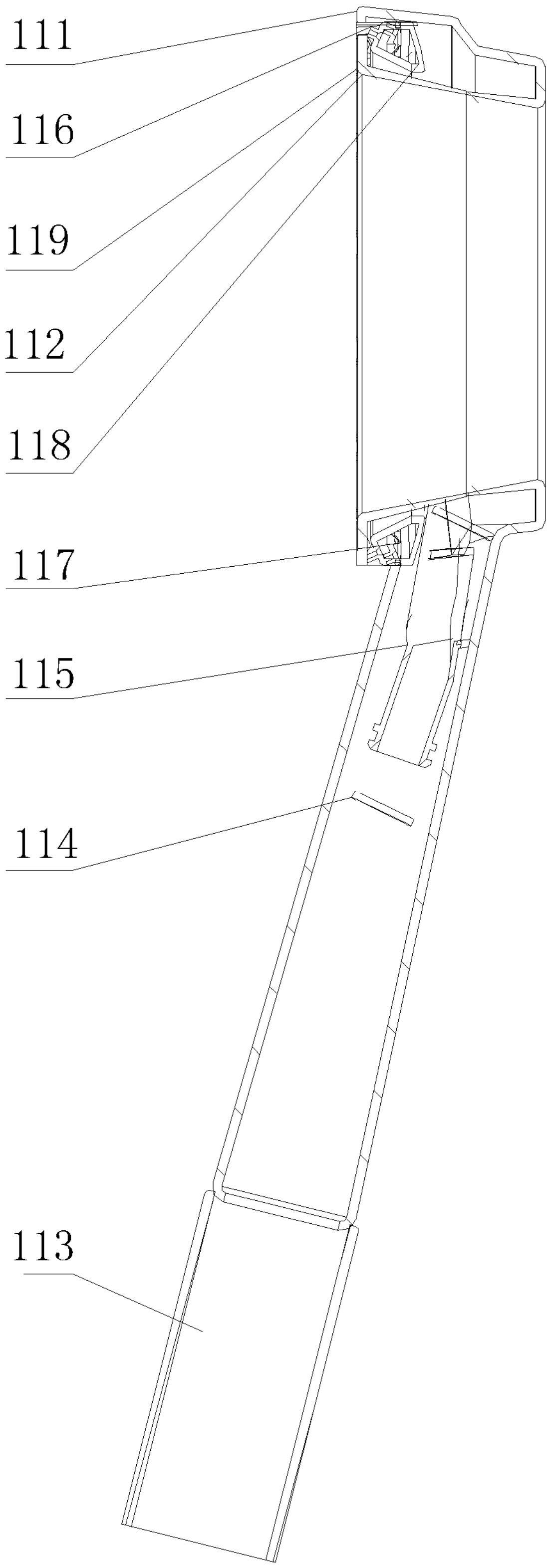
FIG. 3 is a cross sectional view showing the assembly of a part of the automatic shower head according to the preferred embodiment of the present invention.
Figure 4:
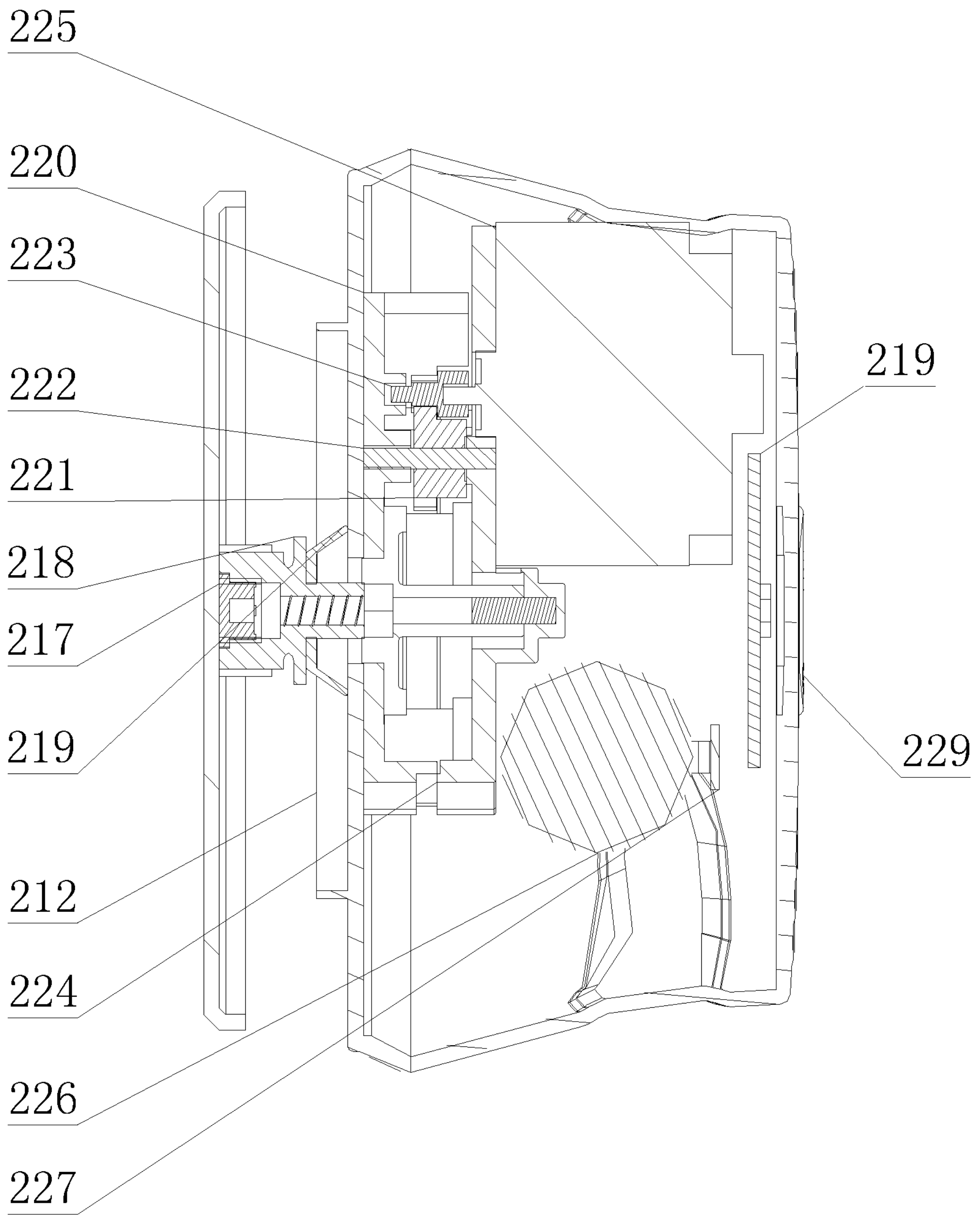
FIG. 4 is another cross sectional view showing the assembly of a part of the automatic shower head according to the preferred embodiment of the present invention.
Figure 5:
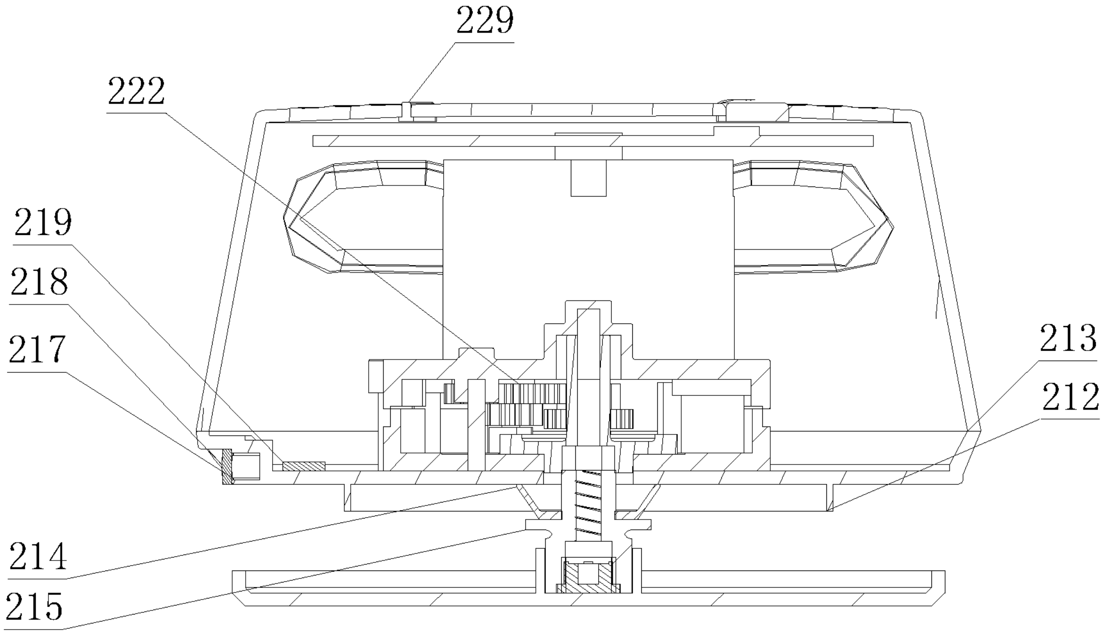
FIG. 5 is also another cross sectional view showing the assembly of a part of the automatic shower head according to the preferred embodiment of the present invention.

With reference to FIGS. 1-5, an automatic shower head according to a preferred embodiment of the present invention comprises: a body 1 and a shower scrubber 2.

The body 1 includes a casing 111, a receiving cap 112 fitted with the casing 111, a handle 113, a first connection element 115 accommodated in the receiving cap 112, a first water guide ring 116 defined between the receiving cap 112 and the first connection element 115, and multiple spray bars 117 and a second water guide ring 118 which are arranged on an inner wall of the casing 111, wherein the first connection element 115 is connected with the second water guide ring 118 in a ultrasonic welding manner so as to form a water conduit, the multiple spray bars 117 are accommodated in the water conduit, and at least one first seal ring 114 is retained on an inlet of the water conduit of the first connection element 115 and the second water guide ring 118. Furthermore, the multiple spray bars 117 are in communication with the first water guide ring 116, and the handle 113 is connected with an extension of the casing 111 so as to rub a user's back. The casing 111 also has a coupling loop 119 received therein.

The shower scrubber 2 includes a panel 211, a lid 212, an accommodation sleeve 213, a second seal ring 214 fixed on a center of a first surface of the lid 212, and a rotation element 215 connected with the second seal ring 214 and fitted in a positioning orifice of the lid 212, and a fixing plug 216 fitted in the rotation element 215, wherein the second seal ring 214 is fitted in the rotation element 215 and the lid 212, and the panel 211 is retained on the first side of the lid 212, wherein the lid 212 is connected with the accommodation sleeve 213 in a ultrasonic welding manner, the lid 212 has a copper pin 217, a waterproof sheet 218, and a first circuit board 219 which are received on a peripheral side of the first surface of the lid 212. In addition, the lid 212 has a gear seat 220, a gear assembly 221, a gear shaft 222, a drive gear 223, a holder 224, a motor 225, a battery 226, a contact sheet 227, and a second circuit board 228 which are arranged on a second side of the lid 212 in order.

The holder 224 is fixed on an output end of the motor 225, the drive gear 223 is inserted through the holder 224 to connect with the output end of the motor 225, and the gear shaft 222 is fixed on a first side of the holder 224. The gear assembly 221 is connected on an end of the gear shaft 222, the holder 224 is fitted on a second side of the gear seat 220, and the gear seat 220 is mounted on the second side of the lid 212.

The motor 225, the battery 226, the contact sheet 227, and the second circuit board 228 are received in the accommodation sleeve 213, and an indicator light 229 and a switch 230 are arranged on an outer wall of the accommodation sleeve 213. The contact sheet 227 and the battery 226 are connected electrically, and the motor 225, the second circuit board 228, the indicator light 229 and the switch 230 are electrically connected with the battery 226, wherein the switch 230 is a touch switch.

The shower scrubber 2 is engaged in a center of the body 1 so as to scrubber and wash the user easily.

The body 1 and the shower scrubber 2 are used solely, for example, the shower scrubber 2 is configured to scrubber, massage, exfoliate the user and wash a face of the user. Preferably, a head element is replaceable onto the automatic shower head.

In operation of the shower scrubber 2, the battery 226 is charged electrically so that the switch 230 is pressed to drive the motor 225 to actuate the drive gear 223 to rotate, such that the head element of the automatic shower head is driven by the driven gear 223 to revolve. Preferably, the switch 230 has different levels so as to adjust a rotation speed of the motor 225 by using the second circuit board 228, and the shower scrubber 2 is engaged in the center of the body 1 so as to scrubber and wash the user easily.

While the preferred embodiments of the invention have been set forth for the purpose of disclosure, modifications of the disclosed embodiments of the invention as well as other embodiments thereof may occur to those skilled in the art. The scope of the claims should not be limited by the preferred embodiments set forth in the examples, but should be given the broadest interpretation consistent with the description as a whole.

What is claimed is:

1. An automatic shower head comprising:

a body and a shower scrubber;

wherein the body includes a casing, a receiving cap fitted with the casing, a handle, a first connection element accommodated in the receiving cap, a first water guide ring defined between the receiving cap and the first connection element, and multiple spray bars and a second water guide ring which are arranged on an inner wall of the casing, wherein the first connection element is connected with the second water guide ring in a ultrasonic welding manner so as to form a water conduit, the multiple spray bars are accommodated in the water conduit, and at least one first seal ring is retained on an inlet of the water conduit of the first connection element and the second water guide ring, the multiple spray bars are in communication with the first water guide ring, and the handle is connected with an extension of the casing, the casing also has a coupling loop received therein;

wherein the shower scrubber includes a panel, a lid, an accommodation sleeve, a second seal ring fixed on a center of a first surface of the lid, and a rotation element connected with the second seal ring and fitted in a positioning orifice of the lid, and a fixing plug fitted in the rotation element, wherein the second seal ring is fitted in the rotation element and the lid, and the panel is retained on the first side of the lid, wherein the lid is connected with the accommodation sleeve in a ultrasonic welding manner, the lid has a copper pin, a waterproof sheet, and a first circuit board which are received on a peripheral side of the first surface of the lid, the lid has a gear seat, a gear assembly, a gear shaft, a drive gear, a holder, a motor, a battery, a contact sheet, and a second circuit board which are arranged on a second side of the lid in order.

2. The automatic shower head as claimed in claim 1, wherein the holder is fixed on an output end of the motor, the drive gear is inserted through the holder to connect with the output end of the motor, and the gear shaft is fixed on a first side of the holder, the gear assembly is connected on an end of the gear shaft, the holder is fitted on a second side of the gear seat, and the gear seat is mounted on the second side of the lid.

3. The automatic shower head as claimed in claim 1, wherein the shower scrubber is engaged in a center of the body.

* * * * *